United States Patent [19]

Graves et al.

[11] Patent Number: 5,304,374
[45] Date of Patent: Apr. 19, 1994

[54] PROCESS FOR ENHANCING THE HYPOCHOLESTEROLEMIC EFFECT OF EDIBLE PULP AND THE PRODUCT OBTAINED THEREBY

[75] Inventors: Frederic A. Graves, Ham Lake; Ani Huang, Fridley, both of Minn.

[73] Assignee: Humanetics Corporation, Chaska, Minn.

[21] Appl. No.: 11,001

[22] Filed: Jan. 29, 1993

Related U.S. Application Data

[60] Division of Ser. No. 682,567, Apr. 9, 1991, Pat. No. 5,202,122, which is a continuation-in-part of Ser. No. 664,490, Mar. 4, 1991, abandoned, which is a continuation of Ser. No. 479,964, Feb. 19, 1990, abandoned, which is a continuation-in-part of Ser. No. 429,166, Oct. 30, 1989, abandoned.

[51] Int. Cl.$^5$ .............................................. A61K 35/78
[52] U.S. Cl. .................................. 424/195.1; 514/57; 536/1.11; 536/2; 536/56; 426/615
[58] Field of Search ................ 424/195.1; 514/57; 536/1.11, 2, 56; 426/615

[56] References Cited

U.S. PATENT DOCUMENTS

| | | | |
|---|---|---|---|
| 67,229 | 7/1867 | Tiffany | 530/101 |
| 2,117,100 | 5/1938 | Milas | 204/31 |
| 2,531,431 | 1/1948 | Hills | 99/100 |
| 2,572,923 | 12/1947 | Gaver et al. | 260/209 |
| 3,676,158 | 7/1972 | Fischer et al. | |
| 3,711,294 | 1/1973 | Atkin et al. | |
| 3,966,984 | 6/1976 | Cocke et al. | 426/472 |
| 3,982,003 | 9/1976 | Mitchell | |
| 4,520,017 | 5/1985 | Tunc | 514/54 |
| 4,672,034 | 6/1987 | Rombouts et al. | 435/207 |
| 4,824,672 | 4/1989 | Day | 424/195 |
| 4,857,331 | 8/1989 | Shaw et al. | 424/441 |
| 4,950,689 | 8/1990 | Yang et al. | 514/777 |
| 5,068,109 | 11/1991 | Foldager et al. | 424/441 |
| 5,085,883 | 2/1992 | Garleb et al. | 426/590 |
| 5,104,676 | 4/1992 | Mahmoud et al. | 426/590 |
| 5,104,677 | 4/1992 | Behr et al. | 426/590 |
| 5,108,774 | 4/1992 | Mills et al. | 426/999 |
| 5,112,638 | 5/1992 | Cagley et al. | 426/640 |
| 5,118,510 | 6/1992 | Kuhrts | 424/451 |

FOREIGN PATENT DOCUMENTS

| | | |
|---|---|---|
| 483070A2 | 4/1992 | European Pat. Off. |
| 2283907 | 9/1974 | France. |
| 82/022531 | 5/1982 | Japan. |
| 85/001860 | 1/1985 | Japan. |
| 91/04674 | 9/1990 | PCT Int'l Appl. |
| WO91/06225 | 5/1991 | PCT Int'l Appl. |
| 91/15517 | 5/1991 | PCT Int'l Appl. |
| 2177100 | 6/1986 | United Kingdom. |

OTHER PUBLICATIONS

Camire and Clydsdale, Effect of pH and Heat Treatment on the Binding of Calcium, Magnesium, Zinc, and Iron to Wheat Bran and Fractions of Dietary Fiber, vol. 46, pp. 548–551 (1981), *Journal of Food Science*.

Anderson, et al., Dietary Fiber and Corinary Heart Dieases, vol. 29, Issue 2, pp. 95–147, (1990), *Food Science and Nutrition*.

Colloidal Dispersions: Polysaccharide Gums, p. 169, *Encyclopedia of Food Science*.

Hoagland and Pfeffer, Cobinding of Bile Acids to Carrot Fiber, vol. 35, pp. 316–319 (1987), *J. Agric Food Chem.*.

(List continued on next page.)

Primary Examiner—John W. Rollins
Attorney, Agent, or Firm—Faegre & Benson

[57] ABSTRACT

Process for enhancing the natural bile acid binding capacity of edible pulp material by either heating an aqueous slurry of the pulp material to at least 40° C. and/or sequentially reacting pulp with a first reactant, such as sodium hydroxide, for activating the pendant hydroxyl groups on the polysaccharide components of the pulp material, a second reactant, such as chloroacetic acid, for carboxylating the activated pendant groups on the polysaccharides, and a third reactant, such as calcium hydroxide, for providing calcium ions which can ionically bond to the carboxylated pendant groups.

37 Claims, No Drawings

OTHER PUBLICATIONS

Hoagland and Pfeffer, Role of Pectin in Binding of Bile Acids to Carrot Fiber, Chapter 20 (1986), *American Chemical Society*.

Hoagland, Binding of Dietary Anions to Vegetable Fiber, vol. 37, No. 5, pp. 31343-31347 (1989), *J. Agric. Food Chem.*

Hoagland and Fishman, Interactions of Calcium Pectate with Phytate, AGFD No. 74.

Celullose, vol. 4, pp. 593-614, Kirk-Othmer, *Encyclopedia of Chemical*.

Abstract, Why Carrots may Reduce Cholesterol, Jun. 27, 1987.

Hoagland, et al., ACS Symp., Series 1986, 310 266-74 Chemical Abstracts vol. 105, 1986, Abstract 113884W.

Lopez, Canning of Vegetables, 10th Ed., pp. 340-341, *A Complete Course in Canning*.

Lopez, Vegetables, 8th Ed., pp. 84-85, *A Complete Course in Canning*.

McFeeters, Pectin Methylation Changes and Calcium Ion Effects on the Texture of Fresh, Fermented, and Acidified Cucumbers, pp. 217-230, (1986) *Chemistry and Function of Pectins*.

Owens, et al., Methods Used At Western Regional Research Laboratory For Extraction and Analysis of Pectic Materials, Bureau of Agricultural and Industrial Chemistry, Jun. 1952.

H.A. Deckers and C. Olieman, "Calibration and Application of High-Performance Size Exclusion Columns for Molecular Weight Distribution of Pectins", *Carbohydrate Polymers*, 6, 361-378, 1986.

P. Albersheim, et al., "Splitting of Pectin Chain Molecules in Neutral Solutions", *Archives of Biochemistry and Biophysics*, 90, 46-51, 1960.

P. L. Farness and B. O. Schneeman, "Effects of Dietary Cellulose, Pectin and Oat Bran on the Small Intestine in the Rat", *J. Nutr.*, 112, 1315-1319, 1982.

D. M. Zimmaro, et al., "Isotonic Tube Feeding Formula Induces Liquid Stool in Normal Subjects: Reversal by Pectin", *Journal of Parenteral and Enteral Nutrition*, 13(2), 117-123, 1989.

K. Shankardass, et al., "Bowel Function of Long-Term Tube-Fed Patients Consuming Formulae With and Without Dietary Fiber", *Journal of Parenteral and Enteral Nutrition*, 14(5), 508-512, 1990.

S. B. Heymsfield, et al., "Fiber Supplementation of Enteral Formulas: Effects on the Bioavailability of Major Nutrients and Gastrointestinal Tolerance", *Journal of Parenteral and Enteral Nutrition*, 12, 265-273, 1988.

J. W. Lampe, et al., "Gastrointestinal Effects of Modified Guar Gum and Soy Polysaccharide as Part of an Enteral Formula Diet", *Journal of Parenteral and Enteral Nutrition*, 16, 538-544, 1992.

L. R. Jacobs and J. R. Lupton, "Effect on Dietary Fibers on Rat Large Bowel Mucosal Growth and Cell Proliferation", *Am. J. Physiol.*, 246, G378-G385, 1984.

D. C. Frankenfield, and P. L. Beyer, "Soy-polysaccharide Fiber: Effect on Diarrhea in Tube-fed, Head-injured Patients", *Am. J. Clin. Nutr.*, 50, 533-538, 1989.

P. A. Guenter, et al., "Tube Feeding-Related Diarrhea in Acutely Ill Patients", *Journal of Parenteral and Enteral Nutrition*, 15(3), 277-280, 1991.

T. P. Kravtchenko, et al., "Improvement of the Selective Depolymerization of Pectic Substances by Chemical 2-Elimination in Aqueous Solution", *Carbohydrate Polymers*, 19, 237-242, 1992.

T. Ide, et al., "Hypolipidemic Effects of Guar Gum and Its Enzyme Hydrolysate in Rats Fed Highly Saturated Fat Diets", *Ann. Nutr. Metab.*, 35, 34-44, 1991.

S. V. Potkins, et al., "Effects of Structural and Non-Structural Polysaccharides in the Diet of the Growing Pig on Gastric Emptying Rate of Passage of Digesta to the Terminal Ileum and Through the Total Gastrointestinal Tract", *British Journal of Nutrition*, 65, 391-413, 1991.

B. Vollmert, "Über den Alkalischen Pektinabbau", *Makromol. Chemie*, 5, 110-127, 1950 (Summary is in English).

(List continued on next page.)

OTHER PUBLICATIONS

S. C. Lee, et al., "Determination of Total, Soluble, and Insoluble Dietary Fiber in Foods—Enzymatic-Gravimetric Method, MES-TRIS Buffer: Collaborative Study", *J. of AOAC International*, 75(3), 395–416, 1992.

E. C. Titgemeyer, et al., "Fermentability of Various Fiber Sources by Human Fecal Bacteria in Vitro", *Am. J. Clin. Nutr.*, 53, 1418–1424, 1991.

L. Prosky, et al., "Determination of Insoluble, Soluble, and Total Dietary Fiber in Foods and Food Products: Interlaboratory Study", *J. Assoc. Off. Anal. Chem.*, 71(5), 1017–1023, 1988.

J. H. Cummings and A. M. Stephen, "The Role of Dietary Fibre in the Human Colon" (review article), *Canadian Medical Association Journal*, 123, 1109–1114, 1980.

J. C. Palacio, et al., *Clinical Nutrition, Enteral and Tube Feeding*, 2nd Edition, W. B. Saunders Company, Philadelphia, 1990, Chapter 29, "Dietary Fiber's Physiologic Effects and Potential Applications to Enteral Nutrition", 556–574.

M. Otsuka, et al., "Influence of Meal Distribution of Wheat Bran on Fecal Bulk, Gastrointestinal Transit Time and Colonic Thymidine Kinase Activity in the Rat", *Journal of Nutrition*, 119, 566–572, 1989.

J. A. Marlett, et al., "Comparison of Dye and Pellet Gastrointestinal Transmit Time During Controlled Diets Differing in Protein and Fiber Levels", *Digestive Diseases and Sciences*, 26, 208–213, 1981.

PROCESS FOR ENHANCING THE HYPOCHOLESTEROLEMIC EFFECT OF EDIBLE PULP AND THE PRODUCT OBTAINED THEREBY

This is a divisional of U.S. patent application Ser. No. 07/682,567, filed 09 Apr. 1991, U.S. Pat. No. 5,202,122, which is a continuation-in-part of application Ser. No. 07/664,490 filed 04 Mar. 1991, which is a continuation of application Ser. No. 07/479,964 filed 14 Feb. 1990, which is a continuation-in-part of application Ser. No. 07/429,166 filed 30 Oct. 1989, all now abandoned.

FIELD OF THE INVENTION

The invention broadly relates to dietary fiber. Specifically, the invention relates to methods for synthetically enhancing the hypocholesterolemic effect of dietary pulp.

BACKGROUND OF THE INVENTION

Cardiovascular Disease

Cardiovascular disease is the number one cause of death in the United States. Based upon statistics gathered by the American Heart Association, cardiovascular disease is believed to be responsible for more than one million deaths each year in the United States. These statistics also indicate that more than five million Americans suffer from some type of diagnosed symptomatic cardiovascular disease while an even larger number are believed to be suffering from an undiagnosed cardiovascular related disease.

Multiple factors are believed to contribute to the development of cardiovascular disease including cigarette smoking, high blood pressure, obesity, and a sedentary lifestyle. In addition, researchers in the field have concluded from various genetic, pathological, epidemiological and intervention studies that a causal relationship exists between serum cholesterol levels and the incidence of cardiovascular disease.

Accordingly, any program designed to reduce the incidence of cardiovascular disease should include steps to reduce serum cholesterol levels.

Cholesterol

Cholesterol is a component of all eucaryotic plasma membranes and is essential for the growth and viability of cells in higher organisms. Cholesterol can be obtained either directly from dietary sources or through in vivo synthesis when the amount of cholesterol obtained from dietary sources is insufficient.

The major sites of cholesterol synthesis in mammals are the liver and the intestine. The committed step in the synthesis of cholesterol is the formation of mevalonate from 3-hydroxy-methylglutaryl CoA which reaction is catalyzed by 3-hydroxy-methylglutaryl CoA reductase.

Dietary cholesterol controls the biosynthesis of cholesterol by inactivating existing 3-hydroxy-methylglutaryl CoA reductase and suppressing the synthesis of additional reductase.

Cholesterol is transported through body fluids by lipoproteins. A lipoprotein is a particle consisting of a core of hydrophobic lipids surrounded by a shell of hydrophilic lipids and apoproteins. The hydrophobic core/hydrophilic surface of lipoproteins permits lipoproteins to solubilize highly hydrophobic lipids such as cholesterol. Lipoproteins are typically classified according to their density. The classes of lipoproteins include chylomicrons, chylomicron remnants, very low-density lipoproteins (VLDL), low-density lipoproteins (LDL), intermediate-density lipoproteins (IDL), and high-density lipoproteins (HDL).

Cholesterol and triacylglycerols obtained from dietary sources are carried from the intestine to adipose tissue and the liver by chylomicrons. The triacylglycerols carried by the chylomicrons are rapidly hydrolyzed by lipases located in the capillaries of the adipose tissue. The resultant cholesterol-rich residues remaining after hydrolyzation of the triacylglycerols are known as chylomicron remnants and are eventually taken up by the liver.

Cholesterol and triacylglycerols synthesized endogenously, in contrast with that obtained from dietary sources, are carried by very-low-density lipoproteins (VLDL). The triacylglycerol content of a VLDL is hydrolyzed by the same lipases that act on chylomicrons. The resulting cholesterol ester-rich remnants remaining after hydrolyzation of the triacylglycerols from the VLDL are known as intermediate-density lipoproteins (IDL). An IDL is either taken up by the liver or converted into a low-density lipoprotein (LDL).

The LDLs contain the greatest percentage of cholesterol of any of the lipoproteins and are the major carriers of cholesterol in the blood. The LDLs are also the major constituent of atherosclerotic plaque. Each LDL contains a core of about 1500 esterified cholesterol molecules surrounded by a shell of hydrophilic phospholipids, unesterified cholesterols and apoproteins. The role of LDLs is to transport cholesterol through the blood stream to peripheral tissues and regulate the synthesis of cholesterol based upon the amount of cholesterol received from dietary sources.

High-density lipoproteins (HDL) pick up cholesterol released into the plasma from dying cells and membranes undergoing turn-over, esterify the cholesterol, and transfer the esterified cholesterol to a VLDL or a LDL by a transfer protein.

In general, cells other than those of the liver and intestine obtain the cholesterol they require for proper functioning from LDLs in blood plasma rather than through synthesis. These cells obtain cholesterol from by binding a LDL at a specific integral membrane receptor protein, internalizing the receptor-LDL complex, hydrolyzing the protein components of the LDL to free amino acids, hydrolyzing the cholesterol esters of the LDL, and then returning the cholesterol-free LDL receptor to the plasma membrane. The released unesterified cholesterol is either used immediately by the cell in membrane synthesis or reesterified and stored inside the cell for later use. It is noted that reesterified cholesterol contains mainly oleate and palmitoleate monounsaturated fatty acids while LDL cholesterol esters contain mainly linoleate polyunsaturated fatty acid.

It is believed that cholesterol contributes to the incidence of such cardiovascular related problems as heart attacks, strokes and peripheral vascular disease by contributing to the formation of arterial atherosclerotic plaques which block the flow of blood through the arteries.

Because of such health risks associated with the level of serum cholesterol, the medical community recommends that serum cholesterol levels be monitored and maintained below about 175 mg/dl. However, despite such warnings, most Americans have a serum cholesterol level well in excess of the recommended 175 mg/dl.

Dietary Fiber

Recent studies have demonstrated that a high fiber diet can decrease serum cholesterol levels. However, the mechanism(s) responsible for this hypocholesterolemic effect are not fully understood.

One prevalent theory is that dietary fiber binds and removes bile acids from the system and thereby causes cholesterol to be converted into replacement bile acids. Specifically, Hoagland P. D. and Pfeffer, P. E., *Cobinding of Bile Acids to Carrot Fiber*, J. Agric. Food Chem. 1987, 35, 316–319 suggests that the bile acid binding capability of vegetable fiber is achieved through $Ca^{++}$ salt linkages between the pectin portion of the fiber and the bile acid.

Unfortunately, despite widespread dissemination of information regarding the health benefits which can be obtained by the consumption of dietary fiber, few individuals consume sufficient dietary fiber to produce a meaningful decrease in their serum cholesterol level. While this situation can be attributed to a variety of factors, one of the principle factors is believed to be the simple lack of dietary fiber in many of the highly processed staple food products currently being consumed.

Accordingly, a substantial need exists for a dietary food supplement having an effective hypocholesterolemic effect which can be incorporated into processed foods in quantities sufficient to significantly reduce serum cholesterol levels without adversely affecting the desirable attributes of the processed food.

SUMMARY OF THE INVENTION

We have discovered several related processes for improving the hypocholesterolemic effect of an edible pulp.

In a first embodiment, the process is direct at improving the hypocholesterolemic effect of an edible pulp by simply heating an aqueous slurry of the pulp to a temperature effective for enhancing the natural hypocholesterolemic effect of the pulp.

In a second aspect, the process is directed at increasing the concentration of pendant alkaline earth metal ions on the fiber contained in the pulp.

We have discovered three distinct methods for improving the natural hypocholesterolemic effect of an edible pulp under the second aspect of the invention. The first method includes the steps of treating the pulp so as to disrupt (rupture) the cell structure of the pulp, and then reacting the disrupted pulp with a reactant(s) capable of chemically coupling alkaline earth metal ions to the fiber material contained in the pulp. Without intending to be limited thereby, we believe that this first method increases the concentration of pendant alkaline earth metal ions on the fiber material by bonding alkaline earth metal ions to reactive pendant groups inherently present on the pectin portion of the fiber material. A typical reactant capable of achieving the desired reaction is an aqueous solution of an alkaline earth metal salt such as $CaCl_2$.

The second method includes the steps of (i) disrupting (rupturing) the cell structure of the pulp material, (ii) reacting the disrupted pulp material with a first reactant(s) capable of chemically modifying at least a portion of the pendant hydroxyl groups on the fiber material contained in the pulp to pendant groups capable of chemically coupling with alkaline earth metal ions, and then (ii) reacting the modified fiber material with a second reactant(s) capable of chemically coupling an alkaline earth metal ion to the modified pendant groups. An exemplary process includes the steps of (aa) preconditioning the pulp by reacting the pulp with an aqueous solution of NaOH, (bb) reacting the preconditioned pulp with an aqueous solution of $CH_2ClCOOH$ so as to carboxylate the pendant hydroxyl groups on the fiber material contained in the preconditioned pulp, and then (cc) reacting the carboxylated fiber material with CaOH so as to bond $Ca^{++}$ to the pendant carboxyl groups.

Unfortunately, we have discovered that the preconditioning step of the second method generally results in such a dramatic increase in the viscosity enhancing ability of the pulp material that continued processing of the preconditioned pulp requires the use of heavy-duty equipment capable of handling such highly viscous materials.

The third method sequentially combines the first and second methods so as to bond an alkaline earth metal ion to the inherently reactive sites on the fiber material contained in the pulp prior to chemically modifying at least a portion of the pendant hydroxyl groups on the fiber material.

We have discovered that by sequentially combining the first and second methods the greater increase in hypocholesterolemic effect associated with method two can be realized without the accompanying dramatic increase in viscosity.

Our invention is also directed towards the modified pulp material which results from treatment of pulp material in accordance with our process.

DETAILED DESCRIPTION OF THE INVENTION INCLUDING A BEST MODE

Definitions

As utilized herein, the term "accessible" means capable of being diffusively approached by a reagent in such a manner as to permit a potential reaction with the reagent.

As utilized herein, the term "carboxylating reactant" refers to a reactant capable of chemically modifying a substrate so as to create pendant carboxyl groups on the substrate.

As utilized herein, the term "chemically coupled" refers to the covalent and noncovalent bonding of molecules and includes specifically, but not exclusively, covalent bonding, electrostatic bonding, hydrogen bonding and van der Waals' bonding.

As utilized herein, the terms "edible" and "dietary" refer to material suitable for human consumption.

As utilized herein, the term "enhance" means to add, increase, improve and/or intensify.

As utilized herein, the term "fiber material" refers to materials comprised substantially of substances which are not digestible by the human digestive tract. Typical fiber materials include cellulose, hemicellulose, lignin and pectic material.

As utilized herein, the phrase "initial step" refers to a step which is performed prior to all other enumerated steps.

As utilized herein, the terms "ion" and "ionic state" refer to an atom or group of atoms that carry a positive or negative electric charge as a result of having lost or gained one or more electrons.

As utilized herein, the phrase "natural bile acid binding capacity" refers to the quantitative ability of a naturally existing and chemically unmodified material to bind bile acid in vivo such that the bound bile acid will remain bound to the material upon passage of the material out of the body.

As utilized herein, the term "pectic material" is employed as a collective designation to refer to protopectin, pectin, pectinate, pectic acid and pectate.

As utilized herein, the term "pulp" refers to that portion of a fruit or vegetable which remains after removal of the juice from the fruit/vegetable and typically includes various ratios of cellulose, hemicellulose, lignin, pectic material, and other water insoluble materials.

As utilized herein, the term "saturate" refers to contacting a solid with sufficient liquid such that a further increase in the volume of liquid will produce substantially no additional increase in surface contact between the liquid and the solid.

As utilized herein, the term "passive water" refers to water which does not contain intentionally added reagents capable of increasing the hypocholesterolemic effect of pulp.

Disclosure

We have discovered several processes for synthetically enhancing the natural hypocholesterolemic effect of edible pulp. A first aspect involves treatment of edible pulp material with heated passive water. A second aspect involves treatment of edible pulp material with interactive reagents capable of increasing the concentration of alkaline earth metal ions chemically coupled to the fiber material which constitutes the pulp.

Four mechanisms believed to be contributing to the enhanced hypocholesterolemic effect include (i) an enhanced ability of the treated dietary fiber to physically and/or chemically remove bile acids from the system and/or enhance bile acid synthesis so as to cause the body to synthesize replacement bile acid from cholesterol, (ii) an enhanced ability of the treated dietary fiber to interfere with lipid absorption and/or metabolism, (iii) an enhanced ability of the treated dietary fiber to be fermented into short-chain fatty acids (SCFA) which are believed to interfere with hepatic cholesterol metabolism, and (iv) an enhanced ability of the treated dietary fiber to favorably alter the concentration of and/or sensitivity to various hormones, such as insulin and glucagon, which affect hepatic cholesterol and lipid synthesis.

Without intending to be limited thereby, we believe that most of the enhanced hypocholesterolemic effect obtained from dietary fiber treated in accordance with the process of this invention is achieved by increasing the natural bile acid binding capacity of the fiber.

Bile

Bile salts are a group of highly effective organic detergents derived from cholesterol which contain both a polar and a nonpolar region. Bile salts are synthesized by the liver and stored in the gallbladder from where they are released into the small intestine for solubilizing dietary lipids. Solubilization of lipids by bile salts aids in digestion of the lipids as such solubilized lipids are more readily hydrolyzed and absorbed by the intestine.

Bile salts are synthesized from cholesterol by the conversion of cholesterol to trihydroxycoprostanoate which is then converted to cholyl CoA. Various bile salts such as glycocholate and taurocholate are then obtained by activation of the resultant cholyl CoA.

Fiber Material

The major constituents of typical dietary fiber include cellulose, hemicellulose, lignin, and pectic. The cellulose, hemicellulose and lignin portions are located within the cell structure where they provide support to the cell. The pectic portion is located between cells where it acts as a biological adhesive to hold the cells together.

Cellulose $(C_6H_{10}O_5)_n$ is one of the major polysaccharides of plants where it provides structure to the plant cells. Cellulose is the most abundant organic compound in the biosphere, comprising more than half of all organic carbon. Cellulose is a highly stable, water insoluble, unbranched polysaccharide consisting of glucose units joined by $\beta$-1,4 glycosidic bonds. Sequential glucose units are rotated 180° to permit hydrogen bonding of the ring oxygen of one glucose unit to the 3-OH group of the subsequent unit. Mammals are not capable of synthesizing cellulases and therefore cannot digest cellulose. However, some ruminants, such as cattle, harbor intestinal cellulase-producing bacterial which permit the digestion of cellulose by these mammals.

Hemicelluloses, despite the name, are carbohydrate polymers which have no chemical relation to cellulose. The name arose because these polysaccharides are commonly associated with cellulose. Typical hemicelluloses include arabin and galactin. Like cellulose, mammals are not capable of synthesizing the enzymes necessary to digest hemicellulose.

Lignin is a water insoluble polysaccharide composed of coniferyl, p-coumaryl and sinapyl alcohols in varying ratios dependent upon the plant species. Lignin joins with cellulose and hemicellulose to provide structure to the cell wall.

Pectin is a water soluble, branched polysaccharide consisting of D-galacturonate units joined by $\alpha$-1,4 glycosidic bonds interrupted with 1,2 L-rhamnose residues. The neutral sugars D-galactose, L-arabinose, D-xylose, and L-fucose form side chains from the $\alpha$-1,4 glycosidic backbone. The $\alpha$-1,4 glycosidic backbone includes about 5–10% by weight methylated carboxyl groups and about 5–10% by weight alpha acetyl groups. The molecular weight of pectin varies greatly from about 20,000 for sugar beet pectin up to about 200,000 for apple and citrus pectins.

Sources of dietary fiber suitable for use as the raw material in my process include specifically, but not exclusively, fruits such as apples, oranges, and grapefruit; vegetables such as carrots, corn, peas and sugar beets; grains such as barley, oats, rice and wheat; and grasses such as sugar cane.

First Aspect

The first aspect of the invention by which the natural hypocholesterolemic effect of a pulp material may be enhanced is a simple yet effective process which involves the step of heating an aqueous slurry of the pulp to a temperature effective for enhancing the natural hypocholesterolemic effect of the pulp.

The amount of water to be added to the pulp depends upon the type of pulp and several interactive factors which include heating costs (increased water = increased heating costs), slurry processability (increased water = increased processability), solubilization capacity (increased water = increased solubilization capacity)

and equipment size (increased water=increased equipment size). Generally, a water to pulp weight ratio of about 2:1 to about 4:1 is satisfactory.

The temperature to which the pulp slurry should be heated depends upon pulp type and requires a balancing of heating costs (increased temperature=increased heating costs) and effectiveness (increased temperature=increased effectiveness). Generally, the pulp slurry should be heated to a temperature of about 4°-100° C. Temperatures of less than about 4° C. do not provide an effective enhancement in bile acid binding capacity regardless of other factors while temperatures above about 100° C. require the utilization of additional energy and implementation of a pressure vessel without providing commensurate benefits. Preferably, the pulp slurry should be heated to a temperature of about 40°-100° C., most preferably about 70°-100° C., as such temperatures provide an effective enhancement in hypocholesterolemic effect within commercially acceptable time and pulp concentration limitations.

Depending upon the temperature of the pulp slurry and, to a significantly lesser extent, the pulp concentration, the pulp should remain in slurry form for about 2-60 minutes, preferably about 10-20 minutes.

Without intending to be limited thereby, we believe that the first aspect of the invention improves the hypocholesterolemic effect of an edible pulp by dissolving the soluble portion of the pulp material and thereby increasing the surface area of the fiber material effective for contacting and removing bile acid from the system. Based upon this theory, anything which increases the dissolution rate of the soluble portion of the pulp material would be effective in optimizing the process of this invention including increased slurry temperatures and decreased pulp concentrations.

Second Aspect

The second aspect of the invention involves various methods of attaching alkali metal ions to the naturally and/or synthetically reactive pendant groups on the polysaccharide fiber materials in the pulp. The treated fiber has a hypocholesterolemic effect which is superior to that achieved by employing the treatment process upon refined pectin and/or refined cellulose. It appears that the combination of constituents naturally found in dietary fiber results in a synergistic hypocholesterolemic effect when treated in accordance with the process of the invention.

Without intending to be limited thereby, we believe that the second aspect of the invention enhances the natural hypocholesterolemic effect of pulp material by enhancing the natural bile acid binding capacity of the pulp material.

Method One

The first method by which the natural hypocholesterolemic effect of a pulp material may be enhanced includes the step of reacting the pulp material with a reactant(s) capable of chemically coupling alkaline earth metal ions at naturally reactive sites on the fiber component of the pulp. We have discovered that the hypocholesterolemic effect may be further improved by treating the pulp material so as to disrupt (rupture) the cell structure of the pulp prior to reacting the pulp material with the coupling reactant(s). It is believed that such rupturing of the cell structure releases certain materials retained within the cells which then assist in obtaining the desired treatment of the fiber.

This first method is premised upon our discovery that the concentration of alkaline earth metal ions coupled to a pulp material may be increased to a limited extent by simply contacting the pulp material with a source of alkaline earth metal ions such as $Mg^{++}$ or $Ca^{++}$ at a pH of less than about 7. Contacting the pulp material with a source of alkaline earth metal ions at a pH of greater than about 7 does not result in a meaningful increase in the concentration of alkaline earth metal ions coupled to the pulp material.

Without intending to be limited thereby, we believe that this method is capable of increasing the concentration of alkaline earth metal ions coupled to a pulp material because pectin contains a proportion of naturally reactive pendant groups which are inherently capable of bonding to alkaline earth metal ions under acidic conditions without modification. For this reason, the preferred pulps include at least about 2% and most preferably at least about 10% pectin.

The initial step of disrupting the cell structure of the pulp is believed to significantly enhance the hypocholesterolemic effect of the resultant treated pulp by significantly increasing the surface area of the pulp material which is accessible to the coupling reactant.

The cell structure may be disrupted by any convenient method including specifically, but not exclusively: freezing, refrigeration, mechanical abrasion, enzymatic reactions, dramatic changes in pressure, and the like.

Coupling reactants suitable for use in this method include any reactant capable of providing a source of alkaline earth metal ions at a pH of less than about 7 such as calcium chloride, calcium sulphate, and Nigari.

The actual extent of any increase in the bile acid binding capacity of the pulp depends upon several factors including the type of pulp employed, the exact reactant(s) employed, and the reaction conditions.

Generically, we have discovered that saturation of the pulp material with about a 0.01N to about 2N aqueous solution of the source of alkaline earth metal ions for about one minute to two hours (dependent upon reaction temperature) at a temperature of about 4°-100° C., preferably about 15 to 30 minutes at a temperature of about 70°-100° C., will typically result in effective bonding of alkaline earth metal ions to the pulp material.

The reaction temperature can significantly affect the speed of the reaction. The reaction proceeds too slowly to be of practical use at temperatures less than about 4° C. while temperatures above about 100° C. result in flashing of the water from the mixture. We believe that the reaction can be conducted at temperatures above about 100° C. by performing the reaction under sufficient pressure so as to prevent flashing. While this would require the use of equipment capable of handling such elevated temperatures and pressures, such as a scrape surface heat exchanger, steam injector system or steam infusion system, the use of elevated temperatures of from about 100° C. to about 150° C. can reduce the reaction time to less than about 1 minute and in many instances to less than about 10 seconds.

Method Two

The second method by which the hypocholesterolemic effect of a pulp material may be enhanced includes the steps of (i) reacting the pulp material with a first reactant(s) capable of chemically modifying/replacing at least a portion of the pendant hydroxyl groups on the fiber constituent of the pulp to pendant groups capable of chemically coupling with alkaline earth metal ions, and then (ii) reacting the once reacted pulp material with a second reactant(s) capable of chemically coupling an alkaline earth metal ion to the altered pendant groups.

As with the first method, we have discovered that the hypocholesterolemic effect may be further improved by treating the pulp material so as to disrupt the cell structure of the pulp prior to reacting the pulp material with the first reactant(s).

This second method is designed to achieve an increase in the hypocholesterolemic effect of a pulp material by increasing the sites available for binding an alkaline earth metal ion and thereby increasing the concentration of alkaline earth metal ions attached to the pulp fiber. As with method one, the actual extent of the increase depends upon several factors including type of pulp employed, the exact reactant(s) employed, and the reaction conditions.

Cell Disruption

The initial step of disrupting the cell structure of the pulp is believed to significantly enhance the hypocholesterolemic effect of the resultant treated pulp by significantly increasing the surface area of the pulp material which is accessible to the activating and coupling reactants.

The cell structure may be disrupted by any convenient method including specifically, but not exclusively: freezing, refrigeration, mechanical abrasion, enzymatic reactions, dramatic changes in pressure, and the like.

Activation of the Pulp Material

The raw pulp is first pretreated to activate at least a portion of the naturally unreactive pendant groups on the polysaccharides contained in the pulp. Specifically, activation of the pulp is believed to be achieved through conversion of pendant hydroxyl groups on the polysaccharides contained in the pulp to pendant groups capable of ionically bonding to an alkaline earth metal ion.

The first step in activation of the pulp material includes treatment of the pulp material with a first activating reactant capable of forming a metal salt with the pendant hydroxide groups. Suitable reactants for use as the first activating reactant in the process include specifically, but not exclusively, caustics such as sodium hydroxide, potassium hydroxide, calcium hydroxide and ammonia hydroxide; alkali metal carbonates and bicarbonates such as sodium bicarbonate and potassium carbonate; and alkaline phosphates such as, disodium phosphate dihydrate, trisodium orthophosphate decahydrate and sodium hexametaphosphate.

We have discovered that activation of the pulp material by bonding metal salts to the pendant hydroxide groups on the polysaccharides contained in the pulp can be achieved only under substantially alkaline pH conditions of between about 7 and about 10. Accordingly, the activating first reactant must be selected to provide an alkaline environment.

The first activating reactant may conveniently be brought into reactive contact with the pulp material by reacting the pulp material with an aqueous solution of the first activating reactant.

The once treated pulp material is then treated with a second activating reactant capable of replacing the cation added by the first activating reactant with a group capable of ionically bonding to an alkaline earth metal ion. Reactants suitable for use as the second activating reactant in the process of the invention include specifically, but not exclusively, carboxylating compounds such as monochlorosodium acetate and monochloroacetic acid.

Similar to the first activating reactant, the second activating reactant may conveniently be brought into reactive contact with the pulp material by reacting the pulp material with an aqueous solution of the reactant.

We have discovered that activation of the pulp material in this manner generally results in a dramatic increase in the viscosity enhancing ability of the pulp material. While such an increase in the viscosity modifying ability of the pulp material typically requires the use of equipment capable of handling such highly viscous materials throughout the remainder of the process, the viscosity increase does not generally interfere with the properties and/or characteristics of the final product.

Without intending to be limited thereby, we believe that the increase in viscosity is caused by the release of pectin from the fiber mass with subsequent formation of sodium carboxymethylcellulose, a known viscosity enhancer.

The reaction time, reaction temperature, reactant concentration, ratio of reactant to pulp material, and type of reactant are interdependent with respect to both the first and second reactions. Generally, it is desired to maintain the reaction temperature during both the first and second activation reactions between about 4° C. to about 100° C. as temperatures below about 4° C. proceed too slowly to be of practical use while temperatures above about 100° C. require special process equipment to maintain efficiency.

Generically, we have discovered that saturation of the pulp material with about a 0.01N to about 2N aqueous solution of each of the activating reactants for about one minute to two hours (dependent upon reaction temperature) at a temperature of about 4°–100° C., preferably about 15 to 30 minutes at a temperature of about 70°–100° C., will typically result in effective activation of the polysaccharides.

We believe that the reaction can be conducted at temperatures above about 100° C. by performing the reaction under sufficient pressure so as to prevent flashing. While this would require the use of equipment capable of handling such elevated temperatures and pressures such as a scrape surface heat exchanger, a steam injector system, and a steam infusion system, the use of elevated temperatures of from about 100° C. to about 150° C. can reduce the reaction time to less than about 1 minute and in many instances to less than about 10 seconds.

Addition of Alkaline Earth Metal Ions to the Activated Pulp Material

Once activated, the pulp material is treated with a third reactant(s) for the purpose of bonding an alkaline earth metal ion to the pulp material at the naturally and synthetically reactive sites. The third reactant(s) is an alkaline earth metal salt which can provide a source of alkaline earth metal ions for bonding to the reactive sites. Suitable reactants for use as the third reactant in our process include specifically, but not exclusively alkaline earth metal hydroxides, alkaline earth metal carbonates, and alkaline earth metal bicarbonates. The preferred alkaline earth metal is calcium.

As with the first and second reactions, the reaction time, reaction temperature, reactant concentration, ratio of reactant to pulp material, and type of reactant for the third reaction are interdependent variables.

Generically, we have discovered that saturation of the pulp material with about a 0.01N to about 2N aqueous solution of the third reactant for about one minute to two hours (dependent upon reaction temperature) at a temperature of about 4°–100° C., preferably about 15 to 30 minutes at a temperature of about 70°–100° C., will typically result in effective chemical bonding of alkaline earth metal ions to the pulp material.

The reaction temperature can significantly affect the speed of the reaction. The reaction proceeds too slowly to be of practical use at temperatures less than about 4° C. while temperatures above about 100° C. result in flashing of the water from the mixture. We believe that the reaction can be conducted at temperatures above about 100° C. by performing the reaction under sufficient pressure so as to prevent flashing. While this would require the use of equipment capable of handling such elevated temperatures and pressures such as a scrape surface heat exchanger, steam injector system, and steam infusion system, the use of elevated temperatures of from about 100° C. to about 150° C. can reduce the reaction time to less than about 1 minute and in many instances to less than about 10 seconds.

While not absolutely necessary, the pulp material should be washed and filtered after each step in the process in order to decrease interaction between the reactants employed in the various stages of the process and remove insoluble precipitates.

Method Three

We have discovered that the dramatic increase in viscosity which results from activation of the pulp material in the second method may be substantially eliminated by treating the pulp material with a source of alkaline earth metal ions in accordance with the first method prior to activating the pulp material in accordance with the second method. Without intending to be limited thereby, we believe that the increase in viscosity results from release of the pectin portion from the pulp material during activation with subsequent formation of carboxymethylcellulose and that treatment of the pulp material in accordance with the first method prior to activation prevents the increase in viscosity by converting soluble pectin to an insoluble pectate.

The ability of the chemically modified pulp material to provide an enhanced hypocholesterolemic effect depends upon several factors which includes the degree of substitution (DS) achieved. The degree of substitution represents the number of hydroxyl groups on each residue which have been effectively activated and coupled to an alkaline earth metal ion. Since each residue has three pendant hydroxyl groups available for activation ($C_2$, $C_5$, and $C_6$ carbon atoms) the maximum theoretical DS is 3.

Final preparation of the modified pulp material involves drying and packaging. The modified pulp material may be dried by any of the well known conventional drying means including specifically but not exclusively press drying, drum drying, fluidized bed drying, freeze drying, forced air oven drying, vacuum oven drying, puff drying, and combinations thereof. The pulp material is preferably dried to a moisture content capable of suppressing the growth of microorganisms and resulting in a product with an effective shelf life. In general, a moisture content of less than about 10% will achieve these desired benefits with a moisture content of less than about 5% being preferred.

The resultant modified pulp may be milled to form a flour which may then be employed in addition to or as a partial substitute for any of the commonly employed farinaceous compounds wherever such farinaceous compounds are employed. Alternatively, the modified pulp material may be granulated for use as a table-top dietary supplement which can be sprinkled onto various foods at the point of consumption. Optionally, the granulated table-top product may be combined with various herbs and spices.

EXPERIMENTAL

Experiment I

First Aspect

Into a stainless steel double boiler equipped with a mixing device is placed 2 liters of deionized water. The water is heated to 80° C. at which time 2 cups of thawed carrot pulp are added. The carrot pulp slurry is maintained at 80° C. under constant agitation for 5 minutes.

The reacted carrot pulp is separated from the water, washed with cold tapwater, filtered through two layers of cheesecloth, frozen and subsequently freeze dried.

Experiment II

Second Aspect

Method One

Into a stainless steel double boiler equipped with a mixing device is placed 2 liters of 0.0275M $CaCl_2$ solution. The calcium chloride solution is heated to 80° C. at which time 2 cups of thawed carrot pulp are added. The carrot pulp slurry is maintained at 80° C. under constant agitation for 5 minutes.

The reacted carrot pulp is separated from the calcium chloride solution, washed with cold tapwater, filtered through two layers of cheesecloth, frozen and subsequently freeze dried.

Experiment III

Second Aspect

Method One

Into a stainless steel double boiler equipped with a mixing device is placed 2 liters of a 0.0275M $CaCl_2$ solution. The calcium chloride solution is heated to 80° C. at which time 2 cups of thawed carrot pulp is added. The carrot pulp slurry is maintained at 80° C. under constant agitation for 30 minutes.

The reacted carrot pulp is separated from the calcium chloride solution, washed with cold tapwater, filtered through a cheesecloth, frozen and subsequently freeze dried.

Experiment IV

Second Aspect

Method One

Into a stainless steel double boiler equipped with a mixing device is placed 1 liter of a 0.055M $CaCl_2$ solution. The calcium chloride solution is heated to 87° C. at which time 2 cups of thawed carrot pulp is added. The carrot pulp slurry is maintained at 87° C. under constant agitation for 10 minutes.

The reacted carrot pulp is separated from the calcium chloride solution, washed with cold tapwater, filtered through a cloth, frozen and subsequently freeze dried.

Experiment V

Second Aspect

Method Two

Into a stainless steel double boiler equipped with a mixing device is placed 4 cups of tap water. The tapwater is heated to 90° C. at which time 2 cups of thawed carrot pulp and 0.9 grams of sodium hydroxide is added to the water to form a first pulp slurry. The first pulp slurry is maintained at 90° C. under constant agitation for one hour. The once reacted pulp is separated from the sodium hydroxide solution by filtration through a cheese cloth and then washed with cold tapwater to remove any residual sodium hydroxide.

The once reacted pulp is placed back into the double boiler, redispersed with 4 cups of tapwater and reheated to 90° C. Into the reheated slurry is placed one teaspoon of flaked $CH_2ClCOOH$ to form a second pulp slurry. The second pulp slurry is maintained at 90° C. under constant agitation for 30 minutes during which time the second pulp slurry will thicken substantially. The thickened, twice-reacted pulp is separated from the $CH_2ClCOOH$ solution by filtration through a cheese cloth, washed with cold tapwater to remove any residual $CH_2ClCOOH$, and then refiltered to remove excess wash water.

Experiment VI

Second Aspect

Method Three

Into a stainless steel double boiler equipped with a mixing device is placed 2 liters of a 0.0275M $CaCl_2$ solution. The calcium chloride solution is heated to 80° C. at which time 2 cups of thawed carrot pulp is added. This first carrot pulp slurry is maintained at 80° C. under constant agitation for 5 minutes. The once reacted carrot pulp is separated from the calcium chloride solution and washed with cold tapwater.

Into a second stainless steel double boiler is placed 4 cups of a 0.1N solution of NaOH. The sodium hydroxide solution is heated to 65° C. and the once reacted carrot pulp added. This second carrot pulp slurry is maintained at 65° C. under constant agitation for 20 minutes. The twice reacted carrot pulp is separated from the sodium hydroxide solution by filtration and washed with cold tapwater.

Into a third double boiler is placed 4 cups of a 0.1N solution of $CH_2ClCOOH$. The monochloroacetic acid solution is heated to 65° C. and the twice reacted carrot pulp added. This third carrot pulp slurry is maintained at 65° C. under constant agitation for 20 minutes. The third reacted carrot pulp is separated from the monochloroacetic acid solution, washed with cold tapwater to remove any residual monochloroacetic acid, frozen and subsequently freeze dried.

Experiment VII

Second Aspect

Method Three

Into a stainless steel double boiler equipped with a mixing device is placed 2 liters of a 0.0275M $CaCl_2$ solution. The calcium chloride solution is heated to 77° C. and 2 cups of thawed carrot pulp added. This first carrot pulp slurry is maintained at 77° C. under constant agitation for 15 minutes to form once reacted carrot pulp.

Into the first carrot pulp slurry, still containing residual calcium chloride, is placed ½ teaspoon $NaHCO_3$ to form a second carrot pulp slurry. The second slurry is maintained at 77° C. under constant agitation for 15 minutes to form twice reacted carrot pulp.

Into the second carrot pulp slurry, still containing residual sodium bicarbonate, is placed ½ teaspoon $CH_2ClCOOH$ to form a third carrot pulp slurry. The third slurry is maintained at 70° C. with occasional agitation for 15 minutes to form thrice reacted carrot pulp. The trice reacted carrot pulp is separated from the monochloroacetic acid solution by filtration and air dried.

Experiment VIII

Fresh Pulp v. Frozen Pulp

Treated fiber was produced in accordance with the procedures set forth in Experiments II–VII based upon the variables set forth in Table One. The viscosity of the treated fiber was measured with a Brookfield Model RVT viscometer equipped with a #1 spindle and recorded. The viscosity of the controls were obtained using aqueous diluted untreated pulp obtained from the same pulp source as that used for the treated pulp tests.

The viscosity of the treated fiber indicates the extent to which the naturally unreactive hydroxyl groups have been replaced with carboxyl groups and/or the extent to which calcium has attached to the fiber. An aqueous solution of a carboxylated and/or calcium treated polysaccharide tends to produce a significantly greater increase in viscosity than untreated polysaccharides. Hence, the viscosity of the treated fiber should directly indicate the degree of substitution and/or calcium attachment (high substitution/attachment=high viscosity).

TABLE ONE

| Fiber Source (type/g) | Frsh/Frzn (hrs) | Treatment Method | CaCl Treatment | | | NaOH Treatment | | | ClCH$_2$COOH Treatment | | | $\mu$ (cps) |
|---|---|---|---|---|---|---|---|---|---|---|---|---|
| | | | Amount (vol/M) | Temp (°C.) | Time (min) | Amount (vol/M) | Temp (°C.) | Time (min) | Amount (vol/M) | Temp (°C.) | Time (min) | |
| Carrot (****) | Fresh | Exp VI | 1 liter 0.0275 M | 85 | 5 | 1 liter 0.1 M | 66 | 20 | 1 liter 0.1 M | 66 | 20 | 10.0 |
| Carrot (****) | Frozen | Exp VI | 1 liter 0.0275 M | 85 | 5 | 1 liter 0.1 M | 66 | 20 | 1 liter 0.1 M | 66 | 20 | 37.0 |
| Carrot (****) | Frozen | Exp V | — | — | — | 1 liter 0.09 M | 88–91 | 60 | 1 liter 0.1 M | 88–91 | 30 | 98.5 |

Conclusions:
The product obtained by treating frozen pulp in accordance with the process of the second method of the invention has a viscosity which is significantly greater than the product obtained by identical treatment of fresh pulp.
Pretreatment of frozen pulp with CaCl (third method) prior to treating the pulp in accordance with the process of the second method of the invention results in a significant reduction in the viscosity of the final product.

I claim:

1. A process for producing a human consumable comestible having a superior hypocholesterolemic capacity which comprises the steps of (i) treating edible pulp with an aqueous calcium ion source at a pH of less than about 7 so as to effect chemical coupling of calcium ions onto the pulp, and (ii) drying the treated edible pulp to a moisture content of less than about 10 wt %; wherein the process is effected at a temperature of less than about 150° C. and yields a bland palatable human consumable comestible.

2. The process of claim 1 wherein the step of treating edible pulp with an aqueous calcium ion source comprises treating edible pulp comprising at least 2% pectin and one other polysaccharide.

3. The process of claim 1 wherein the step of treating edible pulp with an aqueous calcium ion source comprises treating edible pulp comprising at least 10% pectin and one other polysaccharide.

4. The process of claim 1 wherein the step of treating edible pulp with an aqueous calcium ion source comprises treating pulp obtained from a food selected from the group consisting of apples, barley, carrots, corn, grapefruit, oats, oranges, peas, rice, sugarbeets, sugar cane, and wheat.

5. A process for enhancing the hypocholesterolemic effect of edible pulp comprising the steps of (i) obtaining edible pulp which includes a polysaccharide having pendant hydroxyl groups, (ii) chemically treating the edible pulp so as to convert at least a portion of the pendant hydroxyl groups on the polysaccharide to pendant groups capable of chemically coupling with a calcium ion, (iii) treating the once treated edible pulp with an aqueous solution of calcium chloride at a pH of less than about 7 under conditions sufficient to cause at least a portion of the converted pendant groups on the polysaccharide to chemically couple with a calcium ion, and (iv) drying the twice treated edible pulp; whereby the dried pulp is a palatable human consumable comestible effective for assisting in the reduction of cholesterol levels when ingested.

6. The process of claim 5 wherein the step of treating edible pulp with an aqueous solution of calcium chloride comprises treating edible pulp comprising at least 2% pectin and one other polysaccharide.

7. The process of claim 5 wherein the step of replacing the pendant hydroxyl groups on the polysaccharide with pendant groups capable of chemically coupling with a calcium ion comprises replacing the hydroxyl groups with carboxyl groups.

8. The process of claim 7 wherein the step of replacing the pendant hydroxyl groups on the polysaccharide with carboxyl groups comprises the sequential steps of reactively contacting the polysaccharide with an aqueous alkaline solution and then reactively contacting the polysaccharide with a carboxylating reactant.

9. The process of claim 8 wherein the step of contacting the polysaccharide with a carboxylating reactant comprises contacting the polysaccharide with an aqueous solution of a carboxylating reactant selected from the group consisting of monochloroacetic acid and the sodium salt thereof.

10. A process for enhancing the hypocholesterolemic effect of edible pulp comprising the steps of (i) obtaining edible pulp which includes a polysaccharide having pendant hydroxyl groups, (ii) chemically treating the edible pulp so as to convert at least a portion of the pendant hydroxyl groups on the polysaccharide to pendant groups capable of chemically coupling with a calcium ion, (iii) treating the once treated edible pulp with a calcium ion source under conditions effective for causing at least a portion of the converted pendant groups on the polysaccharide to chemically couple with a calcium ion, and (iv) drying the twice treated edible pulp to a moisture content of less than about 10 wt %; wherein the process is effected at a temperature of less than about 150° C. and yields a palatable human consumable comestible.

11. The process of claim 10 wherein the step of treating edible pulp with an aqueous calcium ion source comprises treating edible pulp comprising at least 2% pectin and one other polysaccharide.

12. The process of claim 10 wherein the step of replacing the pendant hydroxyl groups on the polysaccharide with pendant groups capable of chemically coupling with a calcium ion comprises replacing the pendant hydroxyl groups with carboxyl groups.

13. The process of claim 12 wherein the step of replacing the pendant hydroxyl groups on the polysaccharide with carboxyl groups comprises the sequential steps of reactively contacting the polysaccharide with an aqueous alkaline solution and then reactively contacting the polysaccharide with a carboxylating reactant.

14. The process of claim 13 wherein the step of contacting the polysaccharide with a carboxylating reactant comprises contacting the polysaccharide with an aqueous solution of a carboxylating reactant selected from the group consisting of monochloroacetic acid and the sodium salt thereof.

15. A process for producing a human consumable comestible having a superior hypocholesterolemic capacity comprising the steps of (i) obtaining edible pulp which includes a polysaccharide having an inherent concentration of pendant groups which are naturally effective for chemically coupling with calcium ions and an inherent concentration of pendant groups which are naturally ineffective for chemically coupling with calcium ions, (ii) treating the edible pulp with a calcium ion source under conditions sufficient to cause at least a portion of the inherently reactive pendant groups on the polysaccharide to chemically couple with a calcium ion, (iii) chemically treating the once treated edible pulp so as to convert at least a portion of the inherently unreactive pendant groups to pendant groups capable of chemically coupling with a calcium ion, (iv) treating the twice treated edible pulp with an aqueous solution of calcium chloride at a pH of less than about 7 so as to cause at least a portion of the converted pendant groups to chemically couple with a calcium ion, and (v) drying the thrice treated edible pulp; whereby the dried pulp is a palatable human consumable comestible effective for assisting in the control of cholesterol levels when ingested.

16. The process of claim 15 wherein the process is conducted upon an aqueous dispersion of the pulp and the viscosity of the aqueous dispersion remains substantially constant through step (iv) of the process.

17. The process of claim 15 wherein the step of treating edible pulp with an aqueous calcium ion source comprises treating edible pulp comprising at least 2% pectin and one other polysaccharide.

18. The process of claim 15 wherein the step of converting the inherently unreactive pendant groups on the polysaccharides to pendant groups capable of chemically coupling with a calcium ion comprises carboxylating pendant hydroxyl groups present on the polysaccharides.

19. The process of claim 18 wherein the step of carboxylating the pendant hydroxyl groups comprises the sequential steps of reactively contacting the polysaccharides with an aqueous alkaline solution and then reactively contacting the polysaccharides with a carboxylating reactant.

20. The process of claim 19 wherein the step of contacting the polysaccharide with a carboxylating reactant comprises contacting the polysaccharide with an aqueous solution of a carboxylating reactant selected from the group consisting of monochloroacetic acid and the sodium salt thereof.

21. A process for enhancing the hypocholesterolemic effect of edible pulp comprising the steps of (i) obtaining edible pulp which includes a polysaccharide having an inherent concentration of pendant groups which are naturally effective for chemically coupling with calcium ions and an inherent concentration of pendant groups which are naturally ineffective for chemically coupling with calcium ions, (ii) treating the edible pulp with a calcium ion source under conditions effective for causing at least a portion of the inherently reactive pendant groups on the polysaccharide to chemically couple with a calcium ion, (iii) chemically treating the once treated edible pulp so as to convert at least a portion of the inherently unreactive pendant groups on the polysaccharide to pendant groups capable of chemically coupling with a calcium ion, (iv) treating the twice treated edible pulp with a calcium ion source so as to cause at least a portion of the converted pendant groups to chemically couple with a calcium ion, and (v) drying the thrice treated edible pulp to a moisture content of less than about 10 wt %; wherein the process is effected at a temperature of less than about 150° C. and yields a palatable human consumable comestible.

22. The process of claim 21 wherein the step of treating edible pulp with an aqueous calcium ion source comprises treating edible pulp comprising at least 2% pectin and one other polysaccharide.

23. The process of claim 21 wherein the process is conducted upon an aqueous dispersion of the pulp and the viscosity of the aqueous dispersion remains substantially constant through step (iv) of the process.

24. The process of claim 21 wherein the step of converting the inherently unreactive pendant groups to pendant groups capable of chemically coupling with a calcium ion comprises carboxylation of the pendant hydroxyl groups.

25. The process of claim 24 wherein the step of carboxylating the pendant hydroxyl groups comprises the sequential steps of reactively contacting the polysaccharides with an aqueous alkaline solution and then reactively contacting the polysaccharides with a carboxylating reactant.

26. The process of claim 25 wherein the step of contacting the polysaccharide with a carboxylating reactant comprises contacting the polysaccharide with an aqueous solution of a carboxylating reactant selected from the group consisting of monochloroacetic acid and the sodium salt thereof.

27. The process of claim 26 wherein the step of carboxylating the pendant hydroxyl groups comprises the steps of:
(a) saturating the pulp with at least a 0.01N aqueous solution of an alkali metal hydroxide at a temperature of 4° C. to 100° C.,
(b) separating the alkali metal hydroxide treated pulp and the alkali metal hydroxide solution, and
(c) saturating the alkali metal hydroxide treated pulp with an at least a 0.01N aqueous solution of monochloroacetic acid or the sodium salt thereof at a temperature of 4° C. to 100° C.

28. The product obtained by the process of claim 1.
29. The product obtained by the process of claim 5.
30. The product obtained by the process of claim 10.
31. The product obtained by the process of claim 15.
32. The product obtained by the process of claim 21.

33. A treatment method for reducing the cholesterol level of a human subject who could benefit from such treatment which comprises the step of orally administering to said human subject an effective cholesterol reducing quantity of the comestible produced by the process of claim 1.

34. A treatment method for reducing the cholesterol level of a human subject who could benefit from such treatment which comprises the step of orally administering to said human subject an effective cholesterol reducing quantity of the comestible produced by the process of claim 5.

35. A treatment method for controlling the cholesterol level of a human subject who could benefit from such treatment which comprises the step of orally administering to said human subject an effective cholesterol controlling quantity of the comestible produced by the process of claim 10.

36. A treatment method for reducing the cholesterol level of a human subject who could benefit from such treatment which comprises the step of orally administering to said human subject an effective cholesterol reducing quantity of the comestible produced by the process of claim 15.

37. A treatment method for reducing the cholesterol level of a human subject who could benefit from such treatment which comprises the step of orally administering to said human subject an effective cholesterol reducing quantity of the comestible produced by the process of claim 21.

* * * * *